United States Patent
Sanchez et al.

(10) Patent No.: US 10,401,916 B1
(45) Date of Patent: Sep. 3, 2019

(54) GRAVITY LOCKOUT HINGE FOR AN INFORMATION HANDLING SYSTEM

(71) Applicant: Dell Products L.P., Round Rock, TX (US)

(72) Inventors: Anthony J. Sanchez, Pflugerville, TX (US); Jason Scott Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/921,023

(22) Filed: Mar. 14, 2018

(51) Int. Cl.
| | |
|---|---|
| *E05D 11/08* | (2006.01) |
| *G06F 1/16* | (2006.01) |
| *E05D 3/02* | (2006.01) |
| *E05D 11/10* | (2006.01) |
| *F16C 11/10* | (2006.01) |

(52) U.S. Cl.
CPC .............. *G06F 1/1681* (2013.01); *E05D 3/02* (2013.01); *E05D 11/087* (2013.01); *E05D 11/1014* (2013.01); *F16C 11/10* (2013.01); *G06F 1/1616* (2013.01); *E05Y 2201/218* (2013.01); *E05Y 2800/268* (2013.01); *E05Y 2800/424* (2013.01); *E05Y 2900/606* (2013.01)

(58) Field of Classification Search
CPC ........... Y10T 16/54038; Y10T 16/5403; E05D 11/08; E05D 11/081; E05D 11/082; E05D 11/084; E05D 11/085; E05D 11/087; E05D 11/10; E05D 11/105; E05D 11/1014; E05D 2011/1035; E05D 3/02; E05Y 2900/606; E05Y 2201/49; E05Y 2201/218; E05Y 2201/22; E05Y 2800/268; E05Y 2800/424; G06F 1/1681; G06F 1/1616; H04M 1/0261; F16C 11/10
See application file for complete search history.

(56) References Cited

U.S. PATENT DOCUMENTS 2,490,172 A * 12/1949 Swahnberg ........... F16D 43/206
                                                    192/45.006
3,605,175 A *  9/1971 Wilson ................ E05D 11/1014
                                                         16/278

(Continued)

FOREIGN PATENT DOCUMENTS

WO     WO-2015064460 A1 *  5/2015 ........... E05D 11/084

*Primary Examiner* — Chuck Y Mah
(74) *Attorney, Agent, or Firm* — Baker Botts L.L.P.

(57) ABSTRACT

Systems and methods are disclosed for preventing a display component of a portable information handling system from opening when in an upside down position. The portable information handling system may include a base component coupled to the display component by a gravity lockout hinge. The gravity lockout hinge may include a shaft, a bearing channel having a bearing channel surface opposite the shaft, and a movable bearing disposed in the bearing channel. The gravity lockout hinge may, when the portable information handling system is in an upside down position and a gravitational force is exerted on the display component, exert a first frictional torque on the shaft that may cause the movable bearing to contact the shaft and the bearing channel surface, and exert a second frictional torque on the shaft that may prevent an angular position of the display component relative to the base component from being changed.

20 Claims, 10 Drawing Sheets

(56) References Cited

U.S. PATENT DOCUMENTS

| | | | | |
|---|---|---|---|---|
| 3,888,386 A * | 6/1975 | Svensson | A45C 13/34 | |
| | | | 220/829 | |
| 4,750,685 A * | 6/1988 | Frei | B60R 22/4619 | |
| | | | 192/45.006 | |
| 4,986,140 A * | 1/1991 | Morishita | F02N 15/023 | |
| | | | 192/45.018 | |
| 5,165,509 A * | 11/1992 | Kanno | F16D 41/086 | |
| | | | 16/342 | |
| 5,276,945 A * | 1/1994 | Matsumura | A47K 13/10 | |
| | | | 16/337 | |
| 5,311,644 A * | 5/1994 | Laforgerie | E05D 11/1071 | |
| | | | 16/250 | |
| 5,598,607 A * | 2/1997 | Katagiri | E05D 11/084 | |
| | | | 16/337 | |
| 5,638,579 A * | 6/1997 | Tenney | F16M 11/10 | |
| | | | 16/338 | |
| 5,706,700 A * | 1/1998 | Takagi | F02N 15/023 | |
| | | | 188/82.84 | |
| 5,765,263 A * | 6/1998 | Bolinas | E05D 7/0423 | |
| | | | 16/342 | |
| 5,779,015 A * | 7/1998 | Murata | F16D 41/066 | |
| | | | 192/42 | |
| 6,367,354 B1 * | 4/2002 | Mitchell | B25B 13/462 | |
| | | | 81/57.39 | |
| 6,467,129 B1 * | 10/2002 | Bae | B60J 3/0265 | |
| | | | 16/308 | |
| 6,481,056 B1 * | 11/2002 | Jesse | E05D 11/1057 | |
| | | | 16/321 | |
| 6,575,058 B1 * | 6/2003 | Mitchell | B25B 13/462 | |
| | | | 192/38 | |
| 6,584,645 B2 * | 7/2003 | Migli | E05C 17/34 | |
| | | | 16/341 | |
| 2002/0013002 A1 * | 1/2002 | D'Aurora | A61D 17/006 | |
| | | | 436/510 | |
| 2002/0133908 A1 * | 9/2002 | Lin | G06F 1/1616 | |
| | | | 16/346 | |
| 2003/0000796 A1 * | 1/2003 | Kawai | F16D 41/067 | |
| | | | 192/223.2 | |
| 2005/0046374 A1 * | 3/2005 | Ogawa | G06F 1/1616 | |
| | | | 318/614 | |
| 2011/0119867 A1 * | 5/2011 | Chen | G06F 1/1681 | |
| | | | 16/342 | |
| 2011/0314635 A1 * | 12/2011 | Chen | E05D 11/1014 | |
| | | | 16/277 | |
| 2015/0121654 A1 * | 5/2015 | Novin | E05D 3/02 | |
| | | | 16/273 | |
| 2019/0064886 A1 * | 2/2019 | Wendt | G06F 1/1681 | |

* cited by examiner

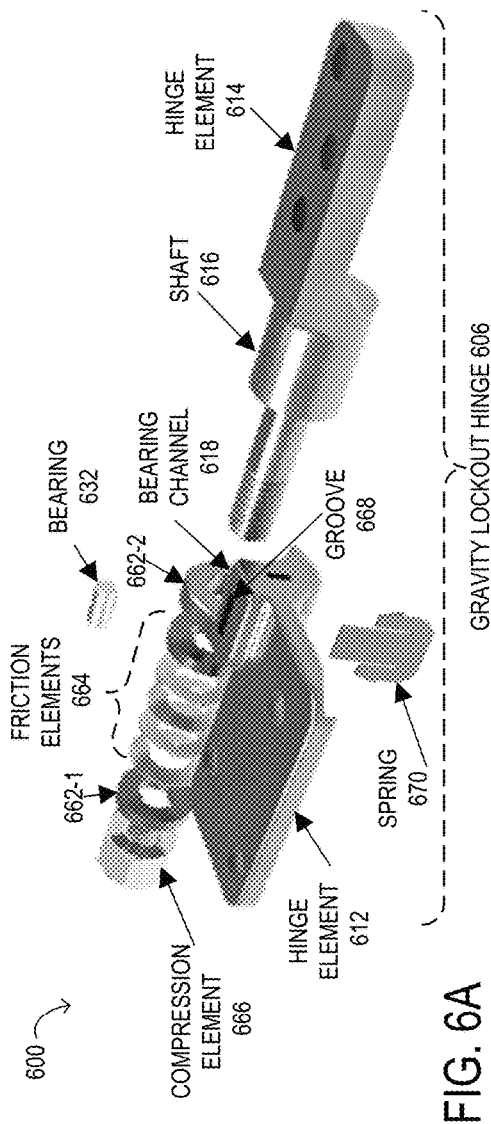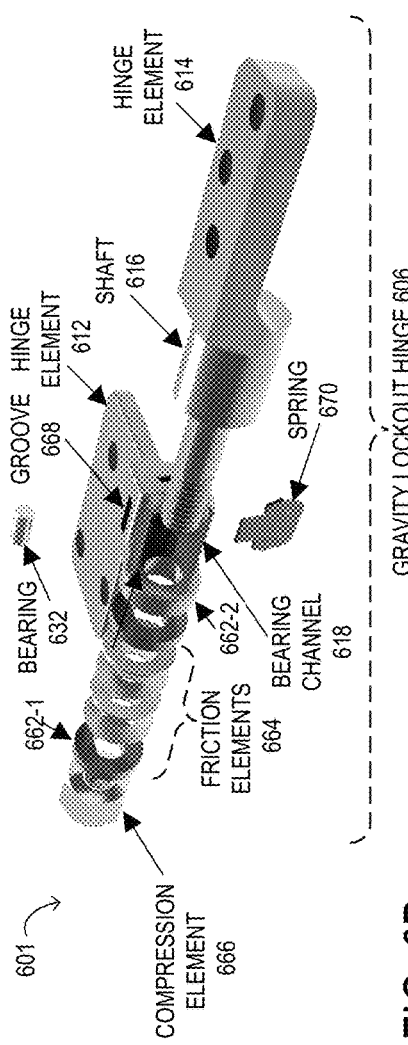
FIG. 6A
FIG. 6B

GRAVITY LOCKOUT HINGE FOR AN INFORMATION HANDLING SYSTEM

BACKGROUND

Field of the Disclosure

This disclosure relates generally to information handling systems and, more particularly, to a gravity lockout hinge structure for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable information handling systems, such as, smart phones, tablet computers, notebook computers, media players, digital cameras, 2-in-1 tablet-laptop combination computers, wireless organizers, and/or combinations thereof. A portable information handling system may generally be any device that a user may carry for handheld use and that includes a processor.

Some portable information handling systems include hinges and latches that couple a display portion of a portable information handling system to a base portion of the portable information handling system. This may allow the portable information handling system to be adjusted to various positions relative to each of the display portion and the base portion of the portable information handling system by a user. In such a portable information handling system, a user may adjust the position of the portable information handling system from a closed position to an open position using one hand. Using latches may require an additional step before the portable information handling system can be opened. The latches are usually quite large and increase the thickness and weight of the portable information handling system, which may make them unsuitable for many portable information handling systems. Other portable information handling systems use hinges and magnets to allow a user to adjust the position of the portable information handling system. When the portable information handling system is in an upside down position, the magnets may prevent or minimize the display portion of the portable information handling system from falling open due to the weight of the display portion and gravity. However, the magnets may increase the initial torque to be overcome when opening the portable information handling system, which may prevent the user from using one hand to open the portable information handling system.

SUMMARY

In one embodiment, a disclosed portable information handling system may include a first device component, a second device component, and a gravity lockout hinge coupled to the first device component and the second device component. The gravity lockout hinge may include a shaft, a bearing channel proximate the shaft, the bearing channel including a bearing channel surface opposite the shaft, and a movable bearing disposed in the bearing channel. The gravity lockout hinge may, when the portable information handling system is in a normal orientation position and a first rotational force in a first rotational direction is exerted on the second device component, exert a first frictional torque in a second rotational direction on the shaft that may allow an angular position of the second device component relative to the first device component to be increased. The first frictional torque may be based on the angular position, and the second rotational direction may be opposite the first rotational direction. The gravity lockout hinge may, when the portable information handling system is in an alternate orientation position and a gravitational force is exerted on the second device component, exert the first frictional torque on the shaft that may cause the movable bearing to contact the shaft and the bearing channel surface, and exert a second frictional torque on the shaft that may prevent the angular position of the second device component from being changed.

In a number of the disclosed embodiments of the portable information handling system, the gravity lockout hinge may, when the portable information handling system is in the alternate orientation position and a second rotational force in the second rotational direction is exerted on the second device component, cause the movable bearing to cease to exert the second frictional torque on the shaft that may allow the angular position of the second display component to be decreased.

In a number of the disclosed embodiments of the portable information handling system, the gravity lockout hinge may also include a first hinge element coupled to and rotatable together with the first device component. The first hinge element may include the bearing channel. The gravity lockout hinge may also a second hinge element coupled to and rotatable together with the second device component, a variable torque cam coupled to the first hinge element and frictionally coupled to the shaft, a compression element coupled to a first end of the shaft opposite a second end of the shaft coupled to the second hinge element, and at least one friction element disposed between the compression element and the variable torque cam. The variable torque cam may, when the angular position of the second device component is increased, exert a compression force on the at least one friction element. The compression force may be based on the angular position and the first frictional torque exerted on the shaft may be based on the compression force.

In a number of the disclosed embodiments of the portable information handling system, the gravity lockout hinge may, when the portable information handling system is in the alternate orientation position and the first rotational force exerted on the second device component is less than or equal to the sum of the first frictional torque and the second frictional torque exerted on the shaft, prevent the angular position of the second device component from being changed.

In a number of the disclosed embodiments of the portable information handling system, the gravity lockout hinge may, when the portable information handling system is in the alternate orientation position and the first rotational force exerted on the second device component is greater than the sum of the first frictional torque and the second frictional torque exerted on the shaft, allow the angular position of the second device component to be increased.

In a number of the disclosed embodiments of the portable information handling system, the movable bearing may comprise one of a needle bearing, a plain bearing, a ball bearing, a roller bearing, and a pin bearing.

In a number of the disclosed embodiments of the portable information handling system, an amount of the second frictional torque exerted on the shaft by the movable bearing may be based on one or more of a friction coefficient of the bearing channel, a friction coefficient of the shaft, a friction coefficient of the movable bearing, a size of the movable bearing, a shape of the movable bearing, a size of the bearing channel, a shape of the bearing channel, and an angle of the bearing channel surface with respect to the shaft.

In a number of the disclosed embodiments of the portable information handling system, the gravity lockout hinge may also include a movable spring disposed in a groove between the movable bearing and the bearing channel surface. The movable spring may include a spring surface proximate the movable bearing. The gravity lockout hinge, when the portable information handling system is in the alternate orientation position, the movable bearing is in contact with the shaft and the spring surface, and the first rotational force exerted on the second device component is greater than the sum of the first frictional torque and the second frictional torque exerted on the shaft, may cause the movable bearing to exert a lateral force on the movable spring that may move the movable spring towards the bearing channel surface and may allow the angular position of the second device component to be increased.

In a number of the disclosed embodiments of the portable information handling system, the gravity lockout hinge may also include a bearing stop disposed in the bearing channel proximate a top edge of the bearing channel surface. The bearing stop may prevent the movable bearing from moving beyond the bearing stop.

In a number of the disclosed embodiments of the portable information handling system, the movable spring may comprise one of a leaf spring, a compression spring, and an extension spring.

In a second embodiment, a disclosed gravity lockout hinge may include a shaft, a first hinge element including a bearing channel proximate the shaft, the bearing channel including a bearing channel surface opposite the shaft, a second hinge element coupled to the first hinge element by the shaft, and a movable bearing disposed in the bearing channel. The gravity lockout hinge may, when the gravity lockout hinge is in a normal orientation position and a first rotational force in a first rotational direction is exerted on the second hinge element, exert a first frictional torque in a second rotational direction on the shaft that may allow an angular position of the second hinge element relative to the first hinge element to be increased. The first frictional torque may be based on the angular position of the second hinge element. The second rotational direction may be opposite the first rotational direction. The gravity lockout hinge may, when the portable information handling system is in an alternate orientation position and a gravitational force is exerted on the second hinge element, exert the first frictional torque on the shaft that may cause the movable bearing to contact the shaft and the bearing channel surface, and may exert a second frictional torque on the shaft that may prevent the angular position of the second hinge element from being changed.

In a number of the disclosed embodiments of the gravity lockout hinge, the gravity lockout hinge may, when the gravity lockout hinge is in the alternate orientation position and a second rotational force in the second rotational direction is exerted on the second hinge element, cause the movable bearing to cease to exert the second frictional torque on the shaft that may allow the angular position of the second hinge element to be decreased.

In a number of the disclosed embodiments of the gravity lockout hinge, the gravity lockout hinge may also include a variable torque cam coupled to the first hinge element and frictionally coupled to the shaft, a compression element coupled to a first end of the shaft opposite a second end of the shaft coupled to the second hinge element, and at least one friction element disposed between the compression element and the variable torque cam. The variable torque cam may, when the angular position of the second hinge element is increased, exert a compression force on the at least one friction element. The compression force may be based on the angular position of the second hinge element and the first frictional torque exerted on the shaft may be based on the compression force.

In a number of the disclosed embodiments of the gravity lockout hinge, the gravity lockout hinge may, when the gravity lockout hinge is in the alternate orientation position and the first rotational force exerted on the second hinge element is less than or equal to the sum of the first frictional torque and the second frictional torque exerted on the shaft, prevent the angular position of the second hinge element from being changed.

In a number of the disclosed embodiments of the gravity lockout hinge, the gravity lockout hinge may, when the gravity lockout hinge is in the alternate orientation position and the first rotational force exerted on the second hinge element is greater than the sum of the first frictional torque and the second frictional torque exerted on the shaft, allow the angular position of the second hinge element to be increased.

In a number of the disclosed embodiments of the gravity lockout hinge, the movable bearing may comprise one of a needle bearing, a plain bearing, a ball bearing, a roller bearing, and a pin bearing.

In a number of the disclosed embodiments of the gravity lockout hinge, an amount of the second frictional torque exerted on the shaft by the movable bearing may be based on one or more of a friction coefficient of the bearing channel, a friction coefficient of the shaft, a friction coefficient of the movable bearing, a size of the movable bearing, a shape of the movable bearing, a size of the bearing channel, a shape of the bearing channel, and an angle of the bearing channel surface with respect to the shaft.

In a number of the disclosed embodiments of the gravity lockout hinge, the gravity lockout hinge may also include a movable spring that may be disposed in a groove between the movable bearing and the bearing channel surface. The gravity lockout hinge may, when the gravity lockout hinge is in the alternate orientation position, the movable bearing is in contact with the shaft and a spring surface of the movable spring, and the first rotational force exerted on the second hinge element is greater than the sum of the first frictional torque and the second frictional torque exerted on the shaft, cause the movable bearing to exert a lateral force on the movable spring that may move the movable spring towards the bearing channel surface and may allow the angular position of the second hinge element to be increased.

In a number of the disclosed embodiments of the gravity lockout hinge, the gravity lockout hinge may also include a bearing stop disposed in the bearing channel proximate a top edge of the bearing channel surface, the bearing stop may prevent the movable bearing from moving beyond the bearing stop.

In a number of the disclosed embodiments of the gravity lockout hinge, the movable spring may comprise one of a leaf spring, a compression spring, and an extension spring.

BRIEF DESCRIPTION OF THE DRAWINGS

For a more complete understanding of the present invention and its features and advantages, reference is now made to the following description, taken in conjunction with the accompanying drawings, in which:

FIGS. 6A and 6B are front and back three quarter views of selected elements of a gravity lockout hinge including a spring;

DESCRIPTION OF PARTICULAR EMBODIMENT(S)

Figure 1:
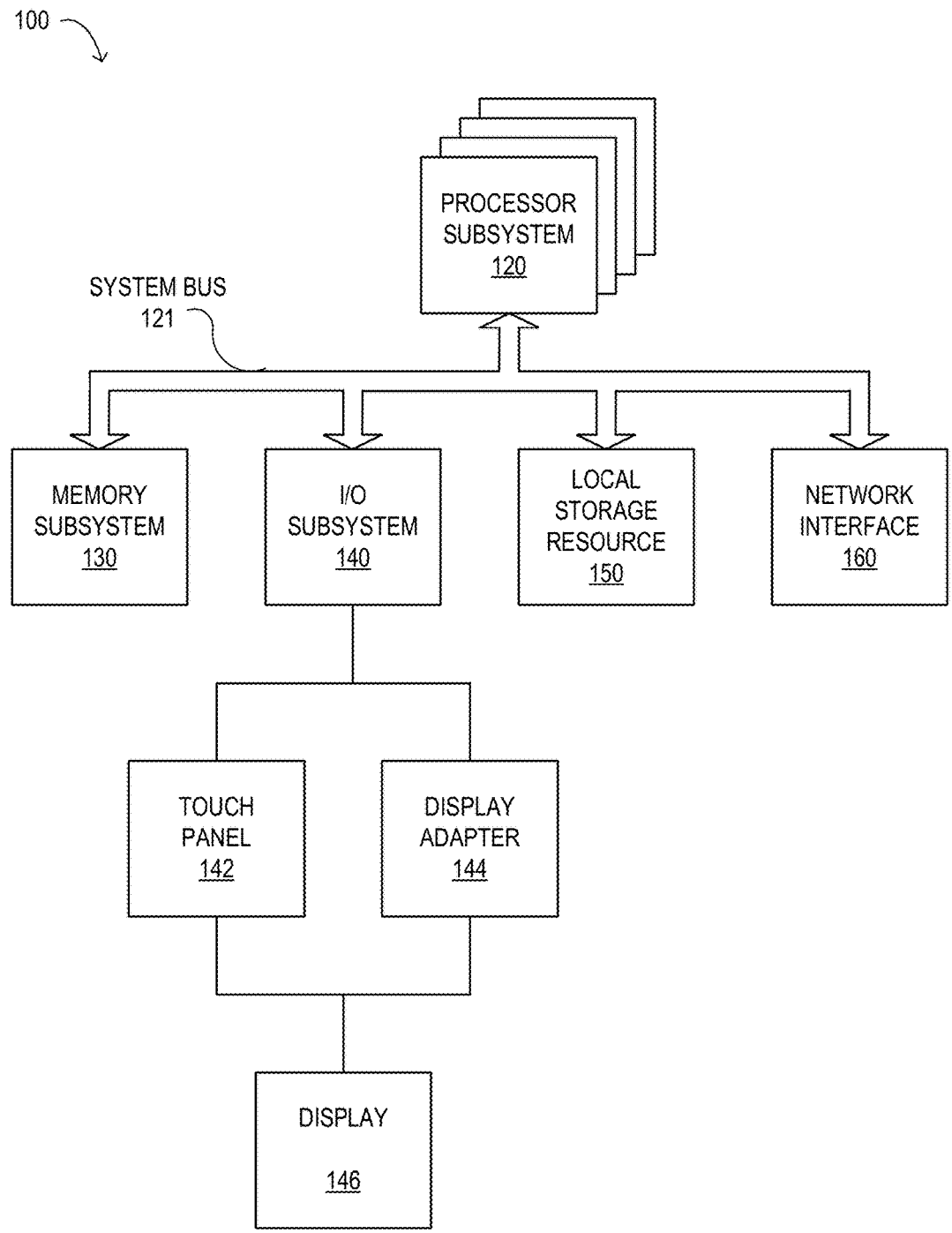
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, portable information handling systems may include hinges and latches that couple a display portion of a portable information handling system to a base portion of the portable information handling system, which may allow the portable information handling system to be adjusted between various positions by a user. Such hinge and latch mechanisms may adversely affect usability requirements, size (e.g., thickness), and weight of a portable information handling system design. For example, a hinge and latch mechanism may require additional steps to open the portable information handling system. Other portable information handling systems may use hinge and magnet mechanisms that may provide minimal or no benefit to the usability to allow a user to adjust the position of the portable information handling system. When the portable information handling system is an upside down position, the hinge and magnet mechanism may provide minimal or no benefit to usability preventing a user from using one hand when opening the portable information handling system. As described in more detail below, a gravity lockout hinge for a portable information handling system may be designed to minimize the initial torque to overcome when opening the portable information handling system allowing a user to open the portable information handling using one hand, prevent the display component from falling open when the portable information handling system is in an upside down position, which may prevent debris from wedging between the display component and the base component that may damage the display component and the portable information handling system from exiting a power saving mode, simplify the steps required to open the portable information handling system to improve usability, reduce the thickness and weight of the portable information handling system, without the need for latches or magnets to lock the system closed.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Turning now to the drawings, FIG. 1 illustrates a block diagram depicting selected elements of a portable information handling system 100 in accordance with a number of embodiments of the present disclosure. In various embodiments, portable information handling system 100 may represent different types of portable information handling systems, such as, smart phones, laptop computers, tablet computers, notebook computers, media players, digital cameras, 2-in-1 tablet-laptop combination computers, and wireless organizers. Components of portable information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network. Network interface 160 may enable information handling system 100 to communicate over the network using a suitable transmission protocol and/or standard, including, but not limited to, transmission protocols and/or standards enumerated below with respect to the discussion of the network. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In portable information handling system 100, I/O subsystem 140 may comprise a system, device, or apparatus generally operable to receive and/or transmit data to/from/within portable information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with display 146 that is driven by display adapter 144.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. In addition to local storage resources 150, in some embodiments, portable information handling system 100 may communicatively couple via network 165 to a network storage resource (not shown) using network interface 160 discussed below.

Network interface 160 may be a suitable system, apparatus, or device operable to serve as an interface between portable information handling system 100 and network 165. Network interface 160 may enable portable information handling system 100 to communicate over a network using any suitable transmission protocol and/or standard, including, but not limited to various transmission protocols and/or standards. The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, the network communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network, network interface 160, and/or various components associated therewith may be implemented using hardware, software, or any combination thereof Network interface 160 may enable wired and/or wireless communications to and/or from portable information handling system 100.

Figure 2:
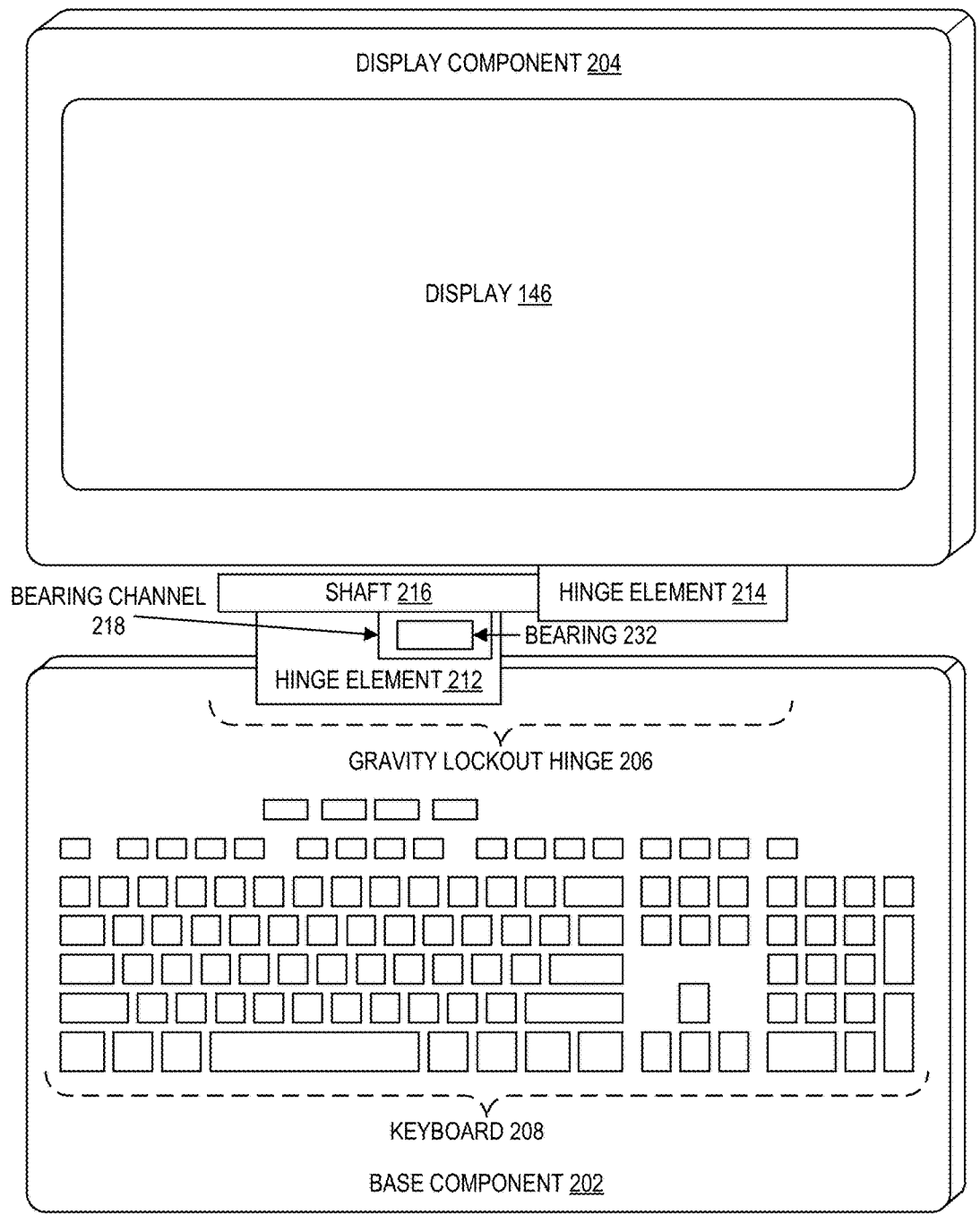
FIG. 2 is a block diagram of selected elements of an embodiment of a portable information handling system including a gravity lockout hinge.

Turning now to FIG. 2, illustrates a block diagram depicting selected elements of a portable information handling system 200 including a gravity lockout hinge in accordance with some embodiments of the present disclosure. Portable information handling system 200 may be structurally and functionally similar to portable information handling system 100 of FIG. 1. In the example embodiment illustrated in FIG. 2, a base component 202 is pivotally coupled to a display component 204 to support various configurations to interact with an end user. More specifically, base component 202 couples to display component 204 via a gravity lockout hinge 206 such that a user may rotate base component 202 and/or display component 204 relative to each other, for example, to increase or decrease an angular position of display component 204 relative to base component 202. Each of base component 202 and display component 204 may include one or more components of the portable information handling system, including but not limited to processor subsystem 120, system bus 121, memory subsystem 130, I/O subsystem 140, local storage resource 150, network interface 160, touch panel 142, display adapter 144, and display 146 discussed above with respect to FIG. 1. Base component 202 may also include a keyboard 208.

Gravity lockout hinge 206 may include a hinge element 212 coupled to and rotatable together with base component 202. Hinge element 212 may include a bearing channel 218. Gravity lockout hinge 206 may also include a hinge element 214 coupled to and rotatable together with display component 204, a shaft 216 pivotally coupling hinge element 212 to hinge element 214, and a movable bearing 232 disposed in bearing channel 218 proximate shaft 216. Movable bearing 232 may comprise one of a needle bearing, a plain bearing, a ball bearing, a roller bearing, and a pin bearing.

Under different circumstances, portable information handling system 200 may be in various orientations and positions including a normal orientation position and an alternate orientation position, for example, upside down for the normal orientation position or right side up for the alternate position. Portable information handling system 200 may be in the normal orientation position when keyboard 208 of base component 202 is facing generally upward and the angle of base component 202 relative to the Y axis is less than 90 degrees and greater than 270 degrees. When portable information handling system 200 is in the normal orientation position and the angle of the display component 204 relative to the Y axis is less than 90 degrees and greater than 270 degrees, gravity will tend to pull display component 204 closed. When portable information handling system 200 is in the normal orientation position and the angle of display component 204 relative to the Y axis is greater than 90 degrees and less than 270 degrees, gravity will tend to pull display component 204 open. Portable information handling system 200 may be in the alternate orientation position when keyboard 208 of base component 202 is facing generally downward and the angle of base component 202 relative to the Y axis is less than 90 degrees and greater than 270 degrees. When portable information handling system 200 is in the alternate orientation position and the angle of the display component 204 relative to the Y axis is less than 90 degrees and greater than 270 degrees, gravity will tend to pull display component 204 open. When portable information handling system 200 is in the alternate orientation position and the angle of display component 204 relative to the Y axis is greater than 90 degrees and less than 270 degrees, gravity will tend to pull display component 204 closed. When portable information handling system 200 is in either the normal orientation position or the alternate orientation position and the angle of the display component 204 relative to the Y axis is equal to 90 degrees or equal to 270 degrees respectively, gravity will tend to have no effect to pull display component 204 open or closed.

When portable information handling system 200 is in the normal orientation position, gravity lockout hinge 206 may operate with a variable torque profile. For example, the variable torque profile may have a low frictional torque initially when display component 204 is in a closed position and a high frictional torque when display component 204 is in a partially opened position. The low frictional torque may allow display component 204 to be opened by one hand of a user. When portable information handling system 200 is in the normal orientation position such that movable bearing 232 is not in contact with shaft 216 and display component 204 is rotated in a first rotational direction that increases an angular position of display component 204 relative to base component 202 (e.g. to open portable information handling system 200), a first frictional torque that varies between a low frictional torque value and a high frictional torque value may be exerted on shaft 216 based on the angular position of display component 204 relative to base component 202. In the normal orientation position, a second frictional torque may be exerted on shaft 216 in a second rotational direction opposite the first rotational direction (e.g. to close portable information handling system 200) that may prevent display component 204 from changing position or closing portable information handling system 200 by gravity. When a user rotates display component 204 in the closing rotational direction with respect to base component 202 such that the second frictional torque is overcome, portable information handling system 200 may be closed.

A user may move portable information handling system 200 from the normal orientation position to the alternate orientation position by, for example, rotating or holding portable information handling system 200 upside down. In the alternate orientation position, the torque may increase in the first rotational direction over the entire opening range but may remain unchanged in the second rotational direction. When portable information handling system 200 is in the alternate orientation position and a rotational force in the first rotational direction is exerted on display component 204, movable bearing 232 may contact shaft 216 and a bearing channel surface of bearing channel 218 opposite shaft 216, the first frictional torque may be exerted on shaft 216, and a third frictional torque may be exerted on shaft 216 by movable bearing 232. When the sum of the first frictional torque and the third frictional torque exerted on shaft 216 is equal to or greater than the rotational force exerted on display component 204, gravity lockout hinge 206 may prevent rotation of display component 204 in the first rotational direction and an angular position of display component 204 relative to base component 202 from being changed. In the alternate orientation position, a rotational force may be exerted on display component 204 due to gravity and weight of display component 204. If the rotational force is less than or equal to the sum of the first frictional torque and the third frictional torque, the gravity lockout hinge 206 may prevent display component 204 from falling open and the angular position of display component 204 from being changed. When a user rotates display component 204 in the second rotational direction with respect to base component 202 such that the second frictional torque is overcome, portable information handling system 200 may be closed. Having the same torque exerted on shaft 216 when display component 204 is rotated in the second rotational direction in either the normal orientation position or the alternate orientation position may allow portable information handling system 200 to be closed before or after portable information handling system 200 is flipped upside down. Once portable information handling system 200 is upside down in the alternate orientation position, display component 204 will not open unless a user uses an excessive force to pull display component 204 open.

FIGS. 3A, 3B, 3C, and 3D are side views of selected elements of an embodiment of portable information handling system 200 including gravity lockout hinge 206 in multiple positions including the normal orientation position, the alternate orientation position, a closed position, and a partially opened position. As shown in FIGS. 3A, 3B, 3C, and 3D, portable information handling system 200 includes base component 202, display component 204, and gravity lockout hinge 206. Gravity lockout hinge 206 includes hinge element 212 having bearing channel 218, hinge element 212, shaft 216, and movable bearing 232 disposed in bearing channel 218 as previously described with reference to FIG. 2.

Figure 3A:
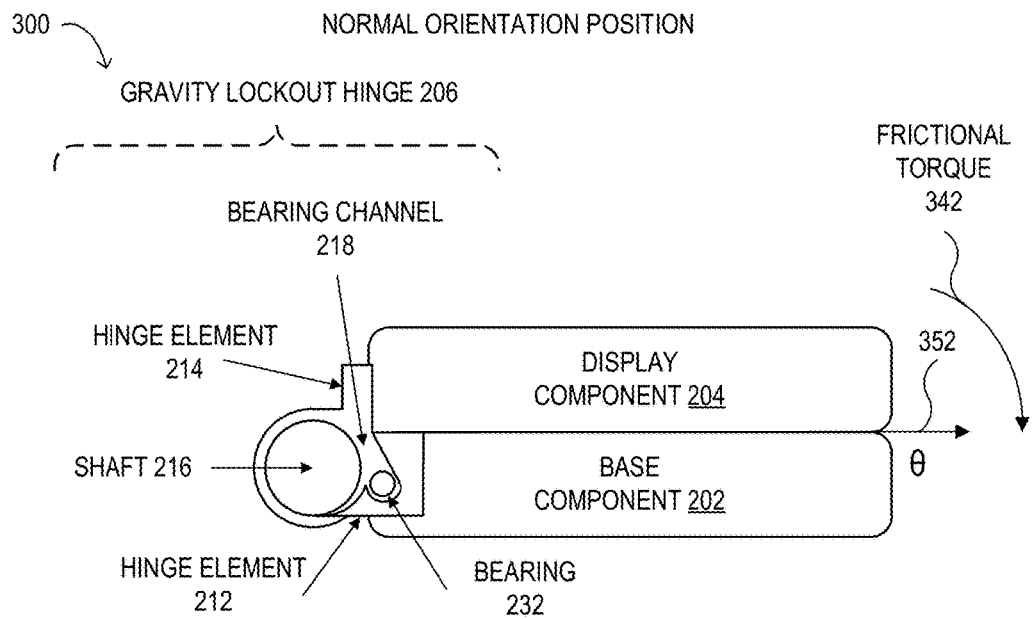
FIGS. 3A, 3B, 3C, and 3D are side views of selected elements of embodiments of a portable information handling system including a gravity lockout hinge in multiple positions.

In FIG. 3A, portable information handling system 200 is shown in the normal orientation position and in a closed position 300. Base component 202 is beneath display component 204 and movable bearing 232 is at the bottom of bearing channel 218 and not in contact with shaft 216. When portable information handling system 200 is in the normal orientation position and display component 204 is rotated in a first rotational direction that increases an angular position of display component 204 relative to base component 202, gravity lockout hinge 206 may exert a frictional torque 342 on shaft 216 that may allow the angular position of display component 204 to be increased and portable information handling system 200 to be opened. Frictional torque 342 may vary between a low frictional torque value and a high frictional torque value. Frictional torque 342 may be based on the angular position of display component 204 relative to base component 202, which is at an angle 352 of approximately 0°. The low frictional torque of frictional torque 342 may allow portable information handling system 200 to be opened by a user with one hand.

Figure 3B:
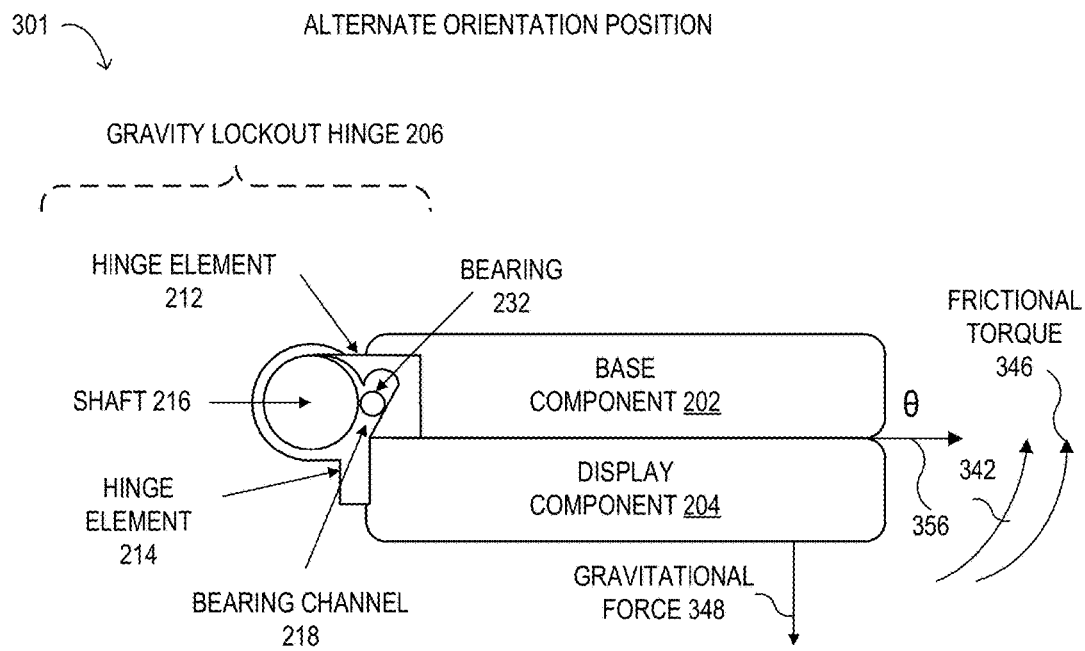

In FIG. 3B, portable information handling system 200 is shown upside down in the alternate orientation position and in a closed position 301. Base component 202 is above display component 204 in a generally horizontal position and movable bearing 232 is in contact with shaft 216 and the bearing channel surface of bearing channel 218 opposite shaft 216. When portable information handling system is in the alternate orientation position and a gravitational force 348 is exerted on display component 204, gravity lockout hinge 206 may exert frictional torque 342 on shaft 216, movable bearing 232 may contact shaft 216 and a bearing channel surface of bearing channel 218 opposite shaft 216, and movable bearing 232 may exert frictional torque 346 on shaft 216. Frictional torque 342 and frictional torque 346 exerted on shaft 216 are independent of the angular position of display component 204 relative to base component 202, which is at an angle 356 of approximately 0°. When the sum of frictional torque 342 and frictional torque 346 exerted on shaft 216 is equal to or greater than gravitational force 348 exerted on display component 204 and the weight of display component 204, gravity lockout hinge 206 may prevent the angular position of display component 204 from being changed and display component 204 from falling open.

Figure 3C:
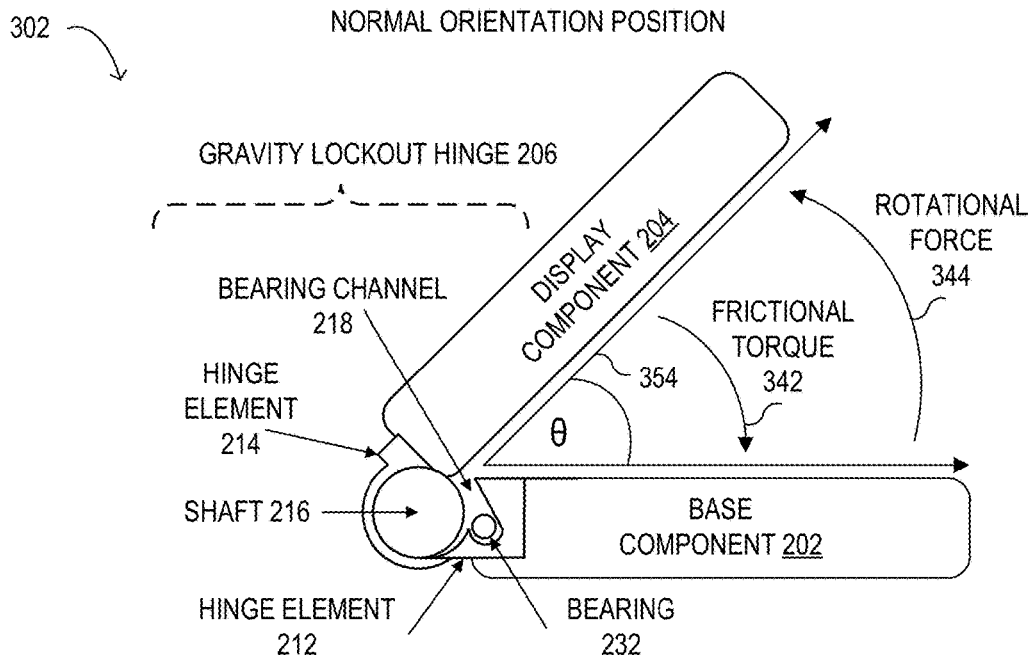

In FIG. 3C, portable information handling system 200 is shown in the normal orientation position and in a partially opened position 302. Base component 202 is beneath display component 204 and movable bearing 232 is at the bottom of bearing channel 218 and not in contact with shaft 216. When portable information handling system 200 is in the normal orientation position and display component 204 is rotated in a first rotational direction that increases an angular position of display component 204 relative to base component 202, gravity lockout hinge 206 may exert frictional torque 342 on shaft 216. Frictional torque 342 may vary between a low frictional torque value and a high frictional torque value. Frictional torque 342 may be based on the angular position of display component 204 relative to base component 202, which is at an angle 354 of approximately 45°. Frictional torque 342 may be the high frictional torque value based on angle 354 of approximately 45°.

Figure 3D:
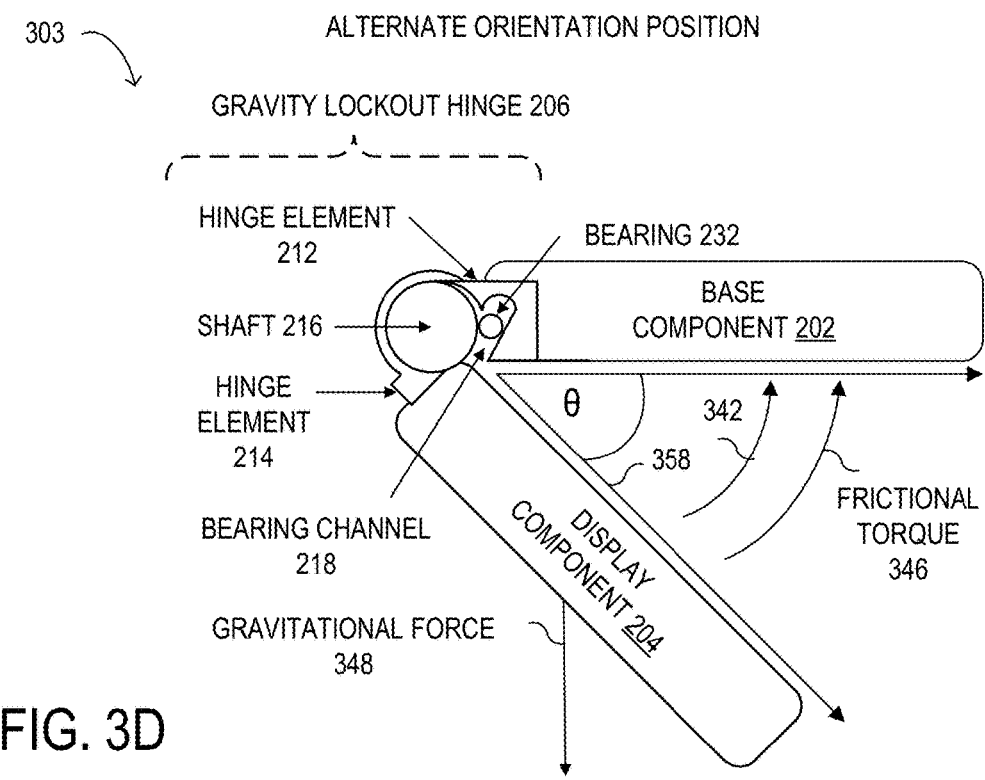

In FIG. 3D, portable information handling system 200 is shown upside down in the alternate orientation position and in a partially opened position 303. Base component 202 is above display component 204 in a generally horizontal position and movable bearing 232 is in contact with shaft 216 and the bearing channel surface of bearing channel 218 opposite shaft 216. When portable information handling system is in the alternate orientation position and in a partially opened position 303, and a gravitational force 348 is exerted on display component 204, gravity lockout hinge 206 may exert frictional torque 342 on shaft 216, movable bearing 232 may contact shaft 216 and a bearing channel surface of bearing channel 218 opposite shaft 216, and movable bearing 232 may exert frictional torque 346 on shaft 216. Frictional torque 342 and frictional torque 346 exerted on shaft 216 are independent of the angular position of display component 204 relative to base component 202, which is at an angle 356 of approximately 45°. When the sum of frictional torque 342 and frictional torque 346 exerted on shaft 216 is equal to or greater than gravitation force 348 exerted on display component 204 and the weight of display component 204, gravity lockout hinge 206 may prevent the angular position of display component 204 from being changed. When portable information handling system 200 is in the alternate orientation position and a first rotational force in the first rotational direction is exerted on display component 204 that is less than or equal to the sum of frictional torque 342 and frictional torque 346 exerted on shaft 216, gravity lockout hinge 206 may prevent rotation of display component 204 in the first rotational direction. When portable information handling system 200 is in the alternate orientation position and a first rotational force in the first rotational direction is exerted on display component 204 that is greater than the sum of frictional torque 342 and frictional torque 346 exerted on shaft 216, gravity lockout hinge 206 may allow rotation of display component 204 in the first rotational direction and the angular position of display component 204 to be increased. When portable information handling system 200 is in the alternate orientation position and display component 204 is rotated in in a second rotational direction that decreases the angular position of display component 204 with respect to base component 202 (e.g. to close portable information handling system 200), gravity lockout hinge 206 may cause movable bearing 232 to not exert frictional torque 346 on shaft 216, which may allow the angular position of display component 204 to be decreased and portable information handling system 200 to be closed.

Figure 4A:
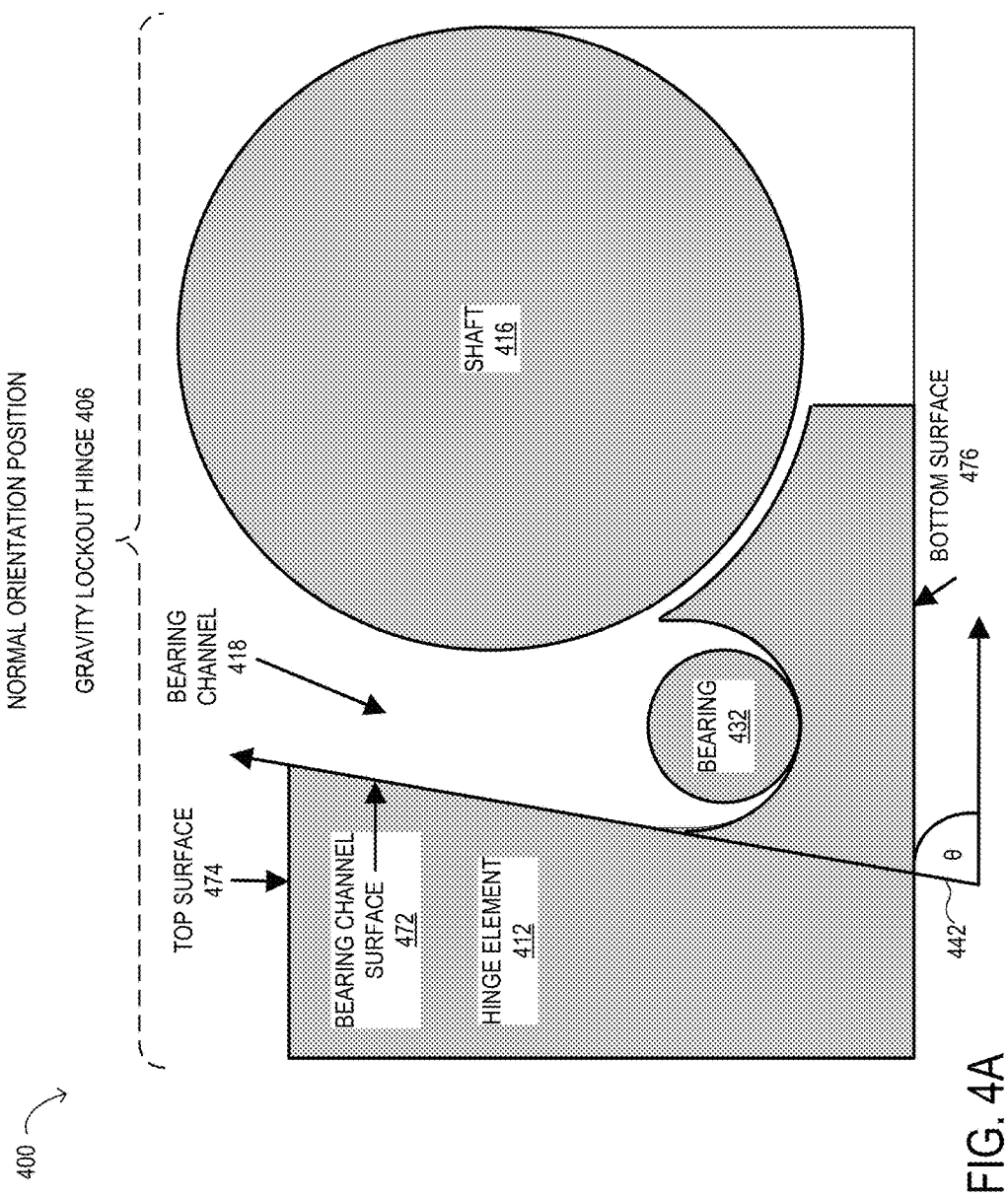
FIGS. 4A and 4B are side views of selected elements of an embodiment of a gravity lockout hinge in multiple positions.
Figure 4B:
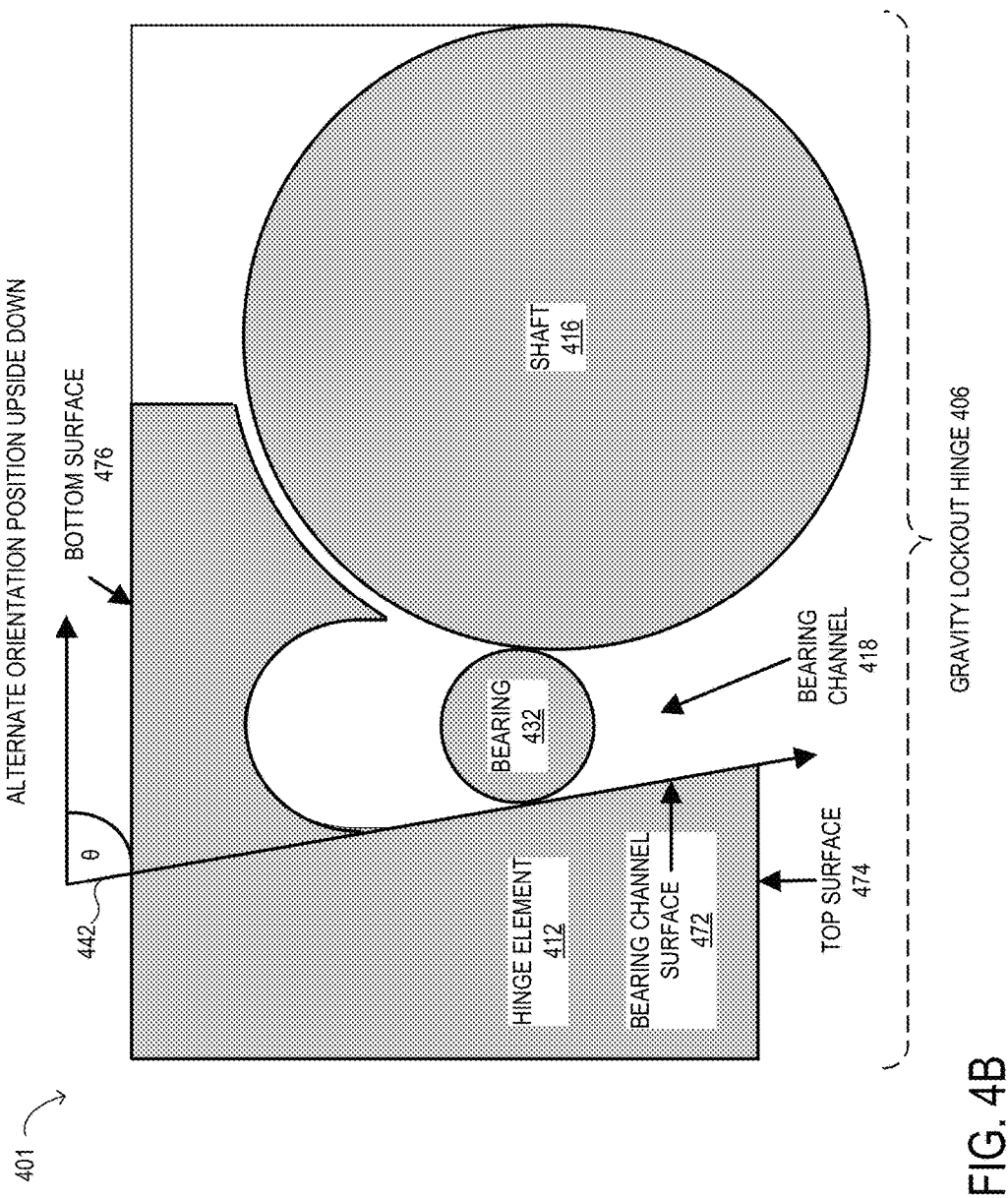

FIGS. 4A and 4B are side views of selected elements of an embodiment of gravity lockout hinge 406 in multiple positions including a normal orientation position and an alternate orientation position. Gravity lockout hinge 406 may be structurally similar to gravity lockout hinge 206 of FIG. 2. As shown in FIGS. 4A and 4B, gravity lockout hinge 406 includes hinge element 412 having bearing channel 418 proximate shaft 416, a bearing channel surface 472 opposite shaft 416, a top surface 474, and a bottom surface 476, shaft 416, and movable bearing 432 disposed in bearing channel 418. Bearing channel surface 472 is shown at an angular position relative to bottom surface 476 of hinge element 412 at an angle 442 of approximately 280°.

In FIG. 4A, gravity lockout hinge 406 is shown in a normal orientation position 400 and hinge element 412 is in a generally horizontal position. When gravity lockout hinge 406 is in the normal orientation position 400, gravity causes movable bearing 432 to fall to the bottom of bearing channel 418 where it is not in contact with shaft 401. In the normal orientation position 400, gravity lockout hinge 406 is unlocked and shaft 416 may rotate in either the first or second rotational directions. When shaft 416 is rotated in the first rotational direction, gravity lockout hinge 406 may exert a first frictional torque that may vary between the low frictional torque value and the high frictional torque value in the second rotational direction opposite the first rotational direction as previously described with reference to FIG. 2.

In FIG. 4B, gravity lockout hinge 406 is shown upside down in an alternate orientation position 401 and hinge element 412 is upside down in a generally horizontal position. Bearing channel surface 472 is shown at an angular position relative to a bottom surface 476 of hinge element 412 at an angle 442 of approximately 280°. When gravity lockout hinge 406 is in the alternate orientation position 401, gravity may cause movable bearing 432 to move into contact with both shaft 416 and bearing channel surface 472. Rotation of shaft 416 in the first rotational direction may cause movable bearing 432 to wedge between shaft 416 and bearing channel surface 472, which may prevent further rotation in the first rotational direction. In the alternate orientation position 401, gravity lockout hinge 406 may be locked in the first rotational direction, which may prevent shaft 416 from rotating in the first rotational direction. However, gravity lockout hinge 406 may be unlocked in the second rotational direction opposite the first rotational direction and shaft 416 may rotate in the second rotational direction. In the alternate position 401, movable bearing 432 may exert a third frictional torque on shaft 416 in the second rotational direction. Together, the first frictional torque exerted by gravity lockout hinge 406 on shaft 416 in the second rotational direction and the third frictional torque exerted by movable bearing 432 on shaft 416 in the second rotational direction may overcome a gravitational rotational force exerted on hinge element 214 of gravity lockout hinge 406 in the first rotational direction opposite the second rotational direction, which may prevent hinge element 214 from falling open and an angular position of hinge element 214 relative to hinge element 212 from being changed. The gravitational rotational force may be based on gravity and the weight of display component 204.

The amount of the third frictional torque exerted on shaft 416 by movable bearing 432 may be based on one or more of a friction coefficient of bearing channel 418, a friction coefficient of shaft 416, a friction coefficient of movable bearing 432, a size of movable bearing 432, a shape of movable bearing 432, a size of bearing channel 418, a shape of bearing channel 418, and the angle 442 of bearing channel surface 472 with respect to bottom surface 476. Only a small value of the third frictional torque exerted on shaft 416 by movable bearing 432 may be needed such that the sum of the first frictional torque exerted by gravity lockout hinge 406 on shaft 416 and the third frictional torque may overcome the gravitational rotational force. In a particular example, in addition to the first frictional torque, the third frictional torque needed to prevent gravity from causing display component 204 coupled to hinge element 414 having a 13" display from falling open is approximately 0.3 kq-cm torque, which may be achieved in less than approximately 0.5° of rotation of shaft 416. At approximately 0.5° of rotation, an approximately 1.5 mm gap may open between hinge element 214 and base component 202 coupled to hinge element 412, which is less than a 5 mm gap required by specification.

Figure 5:
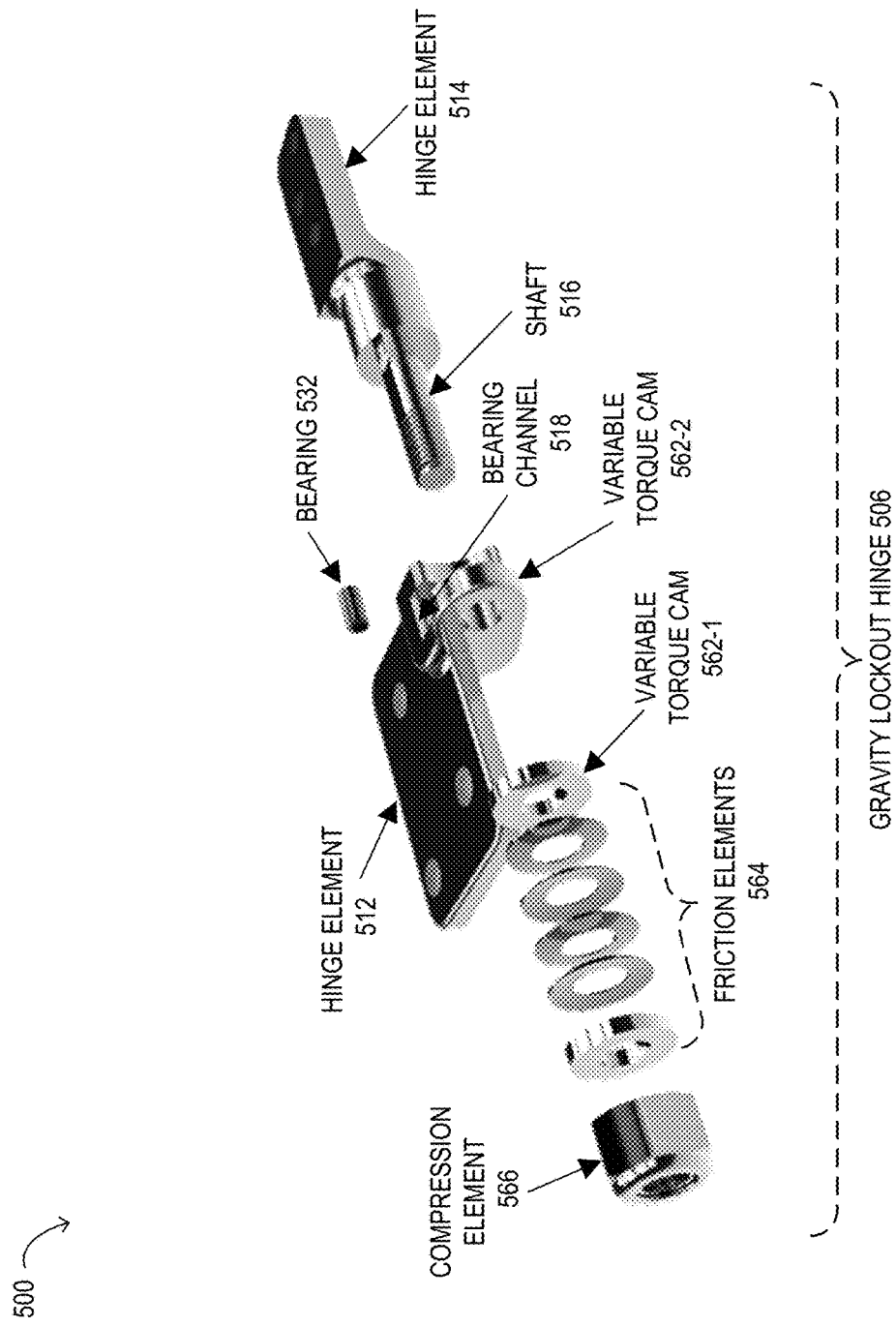
FIG. 5 is a front three quarter view of selected elements of an embodiment of a gravity lockout hinge.

FIG. 5 is a front three quarter view 500 of selected elements of an embodiment of a gravity lockout hinge 506. Gravity lockout hinge 506 may be structurally similar to gravity lockout hinge 206 of FIG. 2. Gravity lockout hinge 506 includes a hinge element 512 having a bearing channel 518 proximate a shaft 516, a hinge element 514, shaft 516 having a first end coupled to hinge element 514 and a second end opposite the first end, variable torque cams 562-1 and 562-2 coupled to hinge element 512 and frictionally coupled to shaft 516, a compression element 566 rotationally coupled to the second end of shaft 516, and one or more friction elements 564 that may be disposed about shaft 516 between compression element 566 and variable torque cam 562-1. A movable bearing may be disposed in bearing channel 518. Friction elements 564 may be a Bellville washer stack, cup washers, or another type of friction element. Shaft 516 may be partially threaded proximate the second end of shaft 516 and compression element 566 may be partially threaded on an inside surface that is compatible with the threading of the second end of shaft 516. When shaft 516 is rotated in the first rotational direction, the threading of the second end of shaft 516 may rotate inward to compression element 566 tightening shaft 516 into compression element 566, which may operate like a spring stack. Tightening shaft 516 into compression element 566 may cause a compression force that varies between a low compression force value and a high compression force value to be exerted on the one or more friction elements 564. The compression force may be based on an angular position of hinge element 514 relative to hinge element 512. The compression force exerted on the one or more friction elements 564 may cause a first frictional torque to be exerted on shaft 516. The first frictional torque may be based on the compression force. The higher the compression force exerted on the one or more friction elements 564, the higher the frictional torque exerted on shaft 516. When gravity lockout hinge 506 is upside down in the alternate orientation position, rotation of shaft 516 in the first rotational direction may cause movable bearing 532 to wedge between shaft 516 and bearing channel surface 572, which may prevent further rotation in the first rotational direction. In the alternate orientation position, gravity lockout hinge 506 may be locked in the first rotational direction, which may prevent shaft 516 from rotating in the first rotational direction. However, gravity lockout hinge 506 may be unlocked in the second rotational direction opposite the first rotational direction and shaft 516 may rotate in the second rotational direction.

FIGS. 6A and 6B are three quarter views of selected elements of an embodiment of a gravity lockout hinge 606 including a spring. FIG. 6A is a front three quarter view 600 of gravity lockout hinge 606 and FIG. 6B is a back three quarter view 601 of gravity lockout hinge 606. Gravity lockout hinge 606 may be structurally similar to gravity lockout hinge 506 of FIG. 5. In FIGS. 6A and 6B, gravity lockout hinge 606 includes a hinge element 612 having a bearing channel 618 proximate a shaft 616 and a groove 668 proximate bearing channel 618, a hinge element 614, shaft 616 having a first end coupled to hinge element 614 and a second end opposite the first end, a bearing 632 disposed in bearing channel 618, variable torque cams 662-1 and 662-2 coupled to hinge element 612 and frictionally coupled to shaft 616, one or more friction elements 664, a compression element 666 rotationally coupled to the second end of shaft 616, and a movable spring 670 disposed in groove 668 proximate bearing channel 618 between movable bearing 632 and the bearing channel surface of bearing channel 618 opposite shaft 618. Movable spring 670 may comprise one of a leaf spring, a compression spring, an extension spring, or another type of spring.

When gravity lockout hinge 506 of FIG. 5 is upside down in the alternate orientation position, gravity causes movable bearing 532 to contact both shaft 516 and the bearing channel surface of bearing channel 518 as described above with reference to FIG. 5. When gravity lockout hinge 506 is upside down in the alternate orientation position, rotation of shaft 516 in the first rotational direction may cause movable bearing 532 to wedge between shaft 516 and bearing channel surface 572, which may prevent further rotation in the first rotational direction. In alternate orientation position 501, gravity lockout hinge 506 may be locked in the first rotational direction, which may prevent shaft 516 from rotating in the first rotational direction. When gravity lockout hinge 506 is locked and shaft 516 is rotated in the first rotational direction by an additional rotational force, the additional rotational force may cause stress on the bearing channel surface, movable bearing 532, and shaft 516, which may result in damage to these components such as forming indentations or dents in the movable bearing 532 and the bearing channel surfaces of bearing channel 518 and shaft 516.

Gravity lockout hinge 606 utilizes movable spring 670 to prevent this type of damage. When gravity lockout hinge 606 is in the alternate orientation position, gravity causes movable bearing 632 to contact both shaft 616 and a spring surface of movable spring 670, and a first rotational force in the first rotational direction exerted on hinge element 614 is greater than the sum of the first frictional torque and the third frictional torque exerted on shaft 616, movable bearing 632 may exert a generally lateral force on movable spring 670 that may move movable spring 670 towards the bearing channel surface of bearing channel 618 and enable hinge element 614 to rotate in the first rotational direction. In this manner, movable spring 670 may prevent damage to movable bearing 632, the bearing channel surface of bearing channel 618, and the surface of shaft 616. The thickness and length of movable spring 670 may be designed such that movable spring 670 will deform without yielding before the contact stress may cause damage. The thickness and length of movable spring 670 may be chosen to provide a desired amount of frictional torque on shaft 616.

Figure 7:
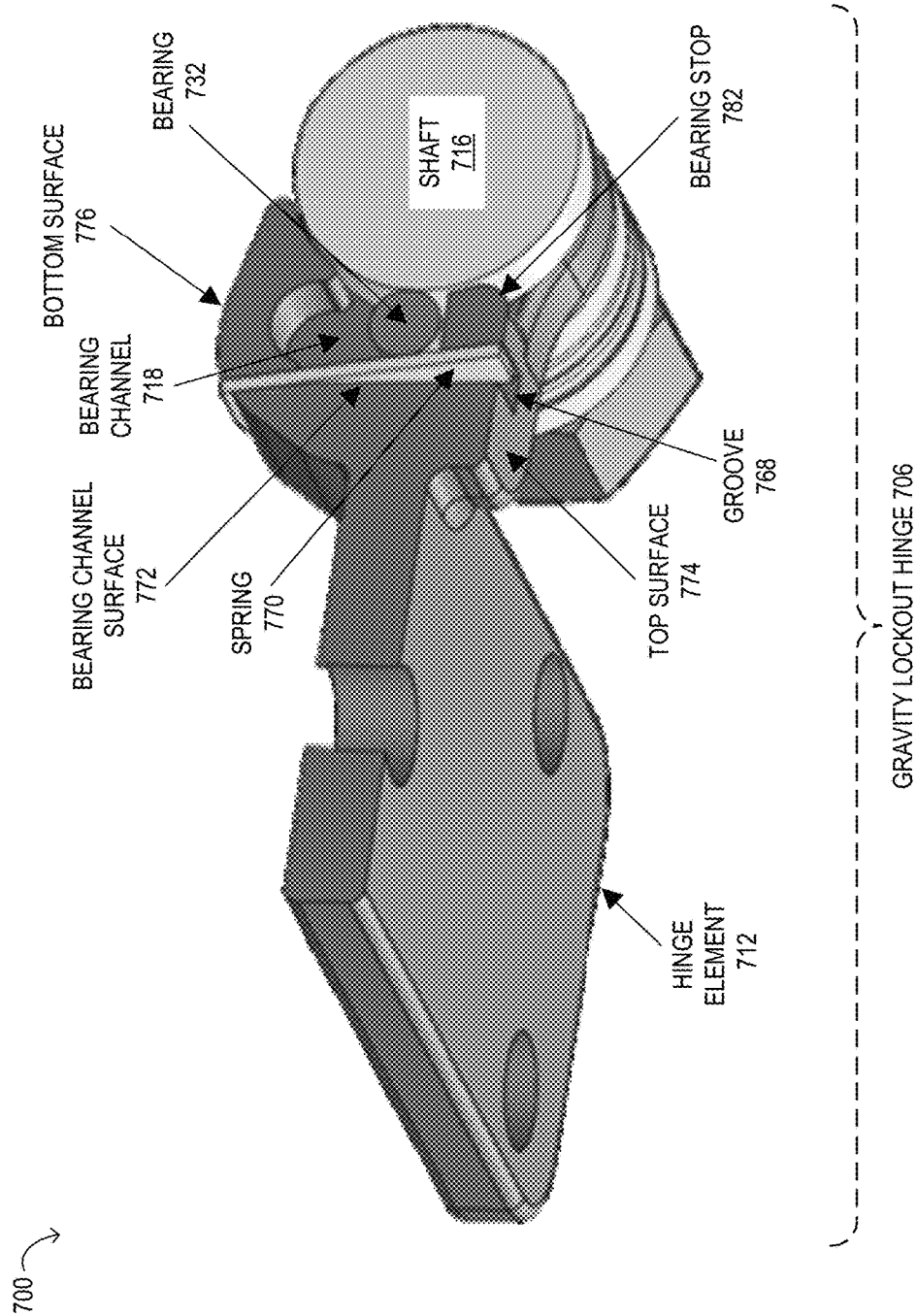
FIG. 7 is a front three quarter view of selected elements of a gravity lockout hinge including a spring and a bearing stop.

FIG. 7 is a front three quarter view of selected elements of an embodiment of a gravity lockout hinge 706 including a bearing stop. Gravity lockout hinge 706 may be structurally similar to gravity lockout hinge 606 of FIG. 6. Gravity lockout hinge 706 includes a hinge element 712 having a bearing channel 718 proximate a shaft 716, a bearing channel surface 772, a top surface 774, a bottom surface 776, a groove 768 proximate bearing channel 718, and a bearing stop 782 disposed in bearing channel 718 proximate top surface 774, shaft 716, a bearing 732 disposed in bearing channel 718, and a movable spring 770 disposed in groove 768 between bearing channel surface 772 and movable bearing 732.

When gravity lockout hinge 706 is in the alternate orientation position, gravity causes movable bearing 732 to contact both shaft 716 and bearing channel surface 772. When shaft 716 is rotated in the first rotational direction, movable bearing 732 may exert a generally lateral force on movable spring 770 that may move movable spring 770 towards the bearing channel surface of bearing channel 718. Continued rotation of shaft 716 in the first rotational direction may cause movable bearing 732 to attempt to move past a center line of shaft 716. Allowing movable bearing 732 to move past the center line of shaft 716 may cause movable bearing 732 to become stuck above the center line of shaft 716, which would defeat the purpose of gravity lockout hinge 706. Bearing stop 782 prevents movable bearing 732 from moving beyond bearing stop 768 and above the center line of shaft 716.

Figure 8:
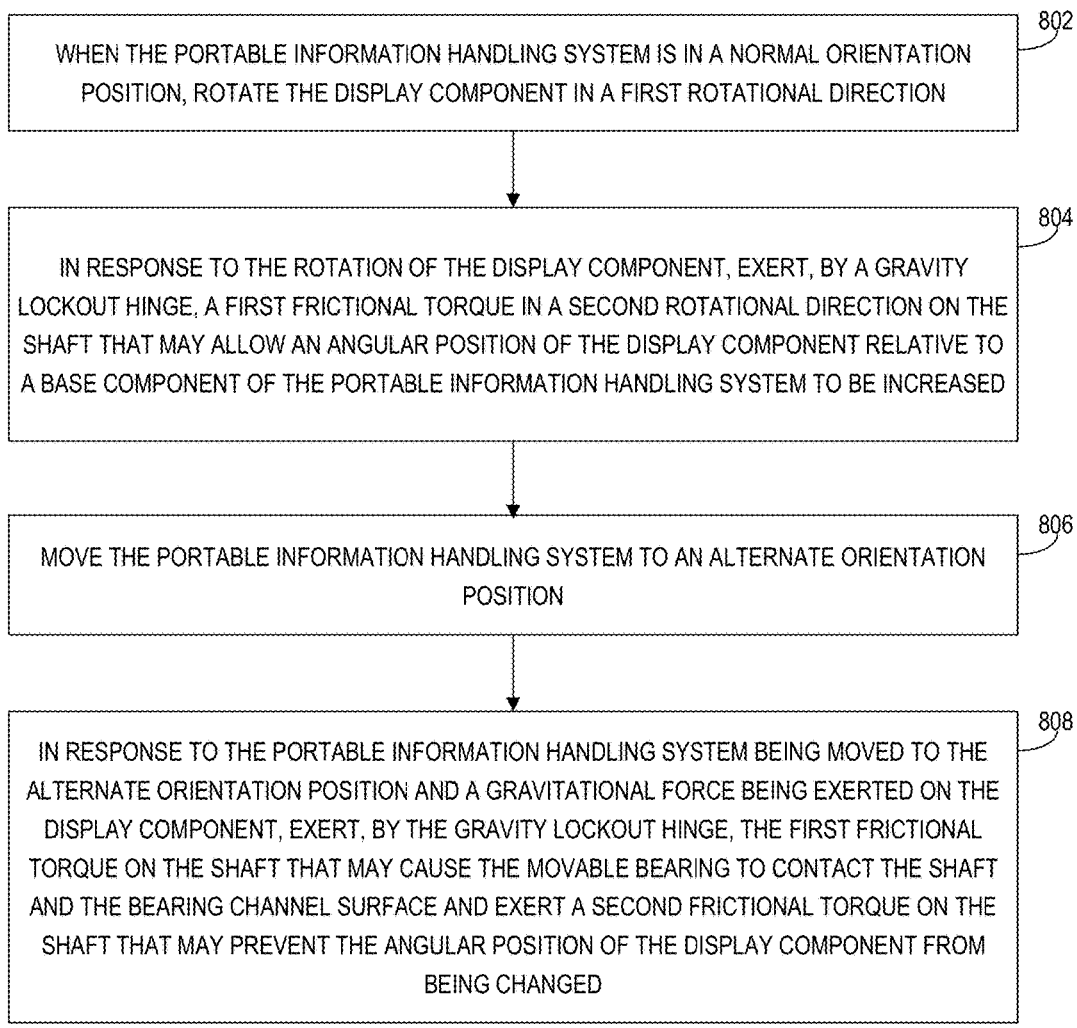
FIG. 8 is flowchart depicting selected elements of an embodiment of a method for preventing a portable information handling system from opening when the portable information handling system is in an upside down position using a gravity lockout hinge.

FIG. 8 is flowchart depicting selected elements of an embodiment of a method 800 for preventing a portable information handling system from opening when the portable information handling system is in an upside down position using a gravity lockout hinge. It is noted that certain operations described in method 800 may be optional or may be rearranged in different embodiments.

Method 800 may begin at step 802, when the portable information handling system is in a normal orientation position, rotate the display component in a first rotational direction. At step 804, in response to the rotation of the display component, exert, by a gravity lockout hinge, a first frictional torque in a second rotational direction on the shaft that may allow an angular position of the display component relative to a base component of the portable information handling system to be increased. The first frictional torque may be based on the angular position of the display component, and the second rotational direction may be opposite the first rotational direction. At step 806, move the portable information handling system to an alternate orientation position. At step 808, in response to the portable information handling system being moved to the alternate orientation position and a gravitational force being exerted on the display component, exert, by the gravity lockout hinge, the first frictional torque on the shaft that may cause the movable bearing to contact the shaft and the bearing channel surface and exert a second frictional torque on the shaft that may prevent the angular position of the display component from being changed.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A portable information handling system, comprising:
    a first device component;
    a second device component; and
    a gravity lockout hinge coupled to the first device component and the second device component, the gravity lockout hinge including:
        a shaft;
        a bearing channel proximate the shaft, the bearing channel including a bearing channel surface opposite the shaft; and
        a movable bearing disposed in the bearing channel,
    the gravity lockout hinge is configured to:
        when the portable information handling system is in a normal orientation position and a first rotational force in a first rotational direction is exerted on the second device component, exert a first frictional torque in a second rotational direction on the shaft to allow an angular position of the second device component relative to the first device component to be increased, the first frictional torque being based on the angular position, and the second rotational direction being opposite the first rotational direction; and
        when the portable information handling system is in an alternate orientation position and a gravitational force is exerted on the second device component, exert the first frictional torque on the shaft to cause the movable bearing to:
            contact the shaft and the bearing channel surface; and
            exert a second frictional torque on the shaft to prevent the angular position of the second device component from being changed.

2. The portable information handling system of claim 1, wherein the gravity lockout hinge is further configured to:
    when the portable information handling system is in the alternate orientation position and a second rotational force in the second rotational direction is exerted on the second device component, cause the movable bearing to cease to exert the second frictional torque on the shaft to allow the angular position of the second display component to be decreased.

3. The portable information handling system of claim 1, wherein:
    the gravity lockout hinge further comprises:
        a first hinge element coupled to and rotatable together with the first device component, the first hinge element includes the bearing channel;
        a second hinge element coupled to and rotatable together with the second device component;
        a variable torque cam coupled to the first hinge element and frictionally coupled to the shaft;
        a compression element coupled to a first end of the shaft opposite a second end of the shaft coupled to the second hinge element; and
        at least one friction element disposed between the compression element and the variable torque cam;
    the variable torque cam is configured to, when the angular position of the second device component is increased, exert a compression force on the at least one friction element, wherein the compression force being based on the angular position, and wherein the first frictional torque exerted on the shaft being based on the compression force.

4. The portable information handling system of claim 1, wherein the gravity lockout hinge is further configured to:
    when the portable information handling system is in the alternate orientation position and the first rotational force exerted on the second device component is less than or equal to the sum of the first frictional torque and the second frictional torque exerted on the shaft, prevent the angular position of the second device component from being changed.

5. The portable information handling system of claim 1, wherein the gravity lockout hinge is further configured to:
    when the portable information handling system is in the alternate orientation position and the first rotational force exerted on the second device component is greater than the sum of the first frictional torque and the second frictional torque exerted on the shaft, allow the angular position of the second device component to be increased.

6. The portable information handling system of claim 1, wherein the movable bearing comprises one of a needle bearing, a plain bearing, a ball bearing, a roller bearing, and a pin bearing.

7. The portable information handling system of claim 1, wherein an amount of the second frictional torque exerted on the shaft by the movable bearing is based on one or more of:
    a friction coefficient of the bearing channel;
    a friction coefficient of the shaft;
    a friction coefficient of the movable bearing;
    a size of the movable bearing;
    a shape of the movable bearing;
    a size of the bearing channel;
    a shape of the bearing channel; and
    an angle of the bearing channel surface with respect to the shaft.

8. The portable information handling system of claim 1, wherein:
    the gravity lockout hinge further comprises a movable spring disposed in a groove between the movable bearing and the bearing channel surface, the movable spring including a spring surface proximate the movable bearing,
    the gravity lockout hinge is further configured to, when the portable information handling system is in the alternate orientation position, the movable bearing is in contact with the shaft and the spring surface, and the first rotational force exerted on the second device component is greater than the sum of the first frictional torque and the second frictional torque exerted on the shaft:
        cause the movable bearing to exert a lateral force on the movable spring to move the movable spring towards the bearing channel surface; and
        allow the angular position of the second device component to be increased.

9. The portable information handling system of claim 1, wherein the gravity lockout hinge further comprises:
    a bearing stop disposed in the bearing channel proximate a top edge of the bearing channel surface, the bearing stop configured to prevent the movable bearing from moving beyond the bearing stop.

10. The portable information handling system of claim 1, wherein the movable spring comprises one of a leaf spring, a compression spring, and an extension spring.

11. A gravity lockout hinge, comprising:
    a shaft;
    a first hinge element including a bearing channel proximate the shaft, the bearing channel including a bearing channel surface opposite the shaft;

a second hinge element coupled to the first hinge element by the shaft; and a movable bearing disposed in the bearing channel, the gravity lockout hinge is configured to:

when the gravity lockout hinge is in a normal orientation position and a first rotational force in a first rotational direction is exerted on the second hinge element, exert a first frictional torque in a second rotational direction on the shaft to allow an angular position of the second hinge element relative to the first hinge element to be increased, the first frictional torque being based on the angular position of the second hinge element, and the second rotational direction being opposite the first rotational direction; and when the portable information handling system is in an alternate orientation position and a gravitational force is exerted on the second hinge element, exert the first frictional torque on the shaft to:

cause the movable bearing to contact the shaft and the bearing channel surface; and exert a second frictional torque on the shaft to prevent the angular position of the second hinge element from being changed.

12. The gravity lockout hinge of claim 11, wherein the gravity lockout hinge is further configured to:

when the gravity lockout hinge is in the alternate orientation position and a second rotational force in the second rotational direction is exerted on the second hinge element, cause the movable bearing to cease to exert the second frictional torque on the shaft to allow the angular position of the second hinge element to be decreased.

13. The gravity lockout hinge of claim 11, wherein:

the gravity lockout hinge further comprises:

a variable torque cam coupled to the first hinge element and frictionally coupled to the shaft;

a compression element coupled to a first end of the shaft opposite a second end of the shaft coupled to the second hinge element; and at least one friction element disposed between the compression element and the variable torque cam;

the variable torque cam is configured to, when the angular position of the second hinge element is increased, exert a compression force on the at least one friction element, wherein the compression force being based on the angular position of the second hinge element, and wherein the first frictional torque exerted on the shaft being based on the compression force.

14. The gravity lockout hinge of claim 11, wherein the gravity lockout hinge is further configured to:

when the gravity lockout hinge is in the alternate orientation position and the first rotational force exerted on the second hinge element is less than or equal to the sum of the first frictional torque and the second frictional torque exerted on the shaft, prevent the angular position of the second hinge element from being changed.

15. The gravity lockout hinge of claim 11, wherein the gravity lockout hinge is further configured to:

when the gravity lockout hinge is in the alternate orientation position and the first rotational force exerted on the second hinge element is greater than the sum of the first frictional torque and the second frictional torque exerted on the shaft, allow the angular position of the second hinge element to be increased.

16. The gravity lockout hinge of claim 11, wherein the movable bearing comprises one of a needle bearing, a plain bearing, a ball bearing, a roller bearing, and a pin bearing.

17. The gravity lockout hinge of claim 11, wherein an amount of the second frictional torque exerted on the shaft by the movable bearing is based on one or more of:

a friction coefficient of the bearing channel;

a friction coefficient of the shaft;

a friction coefficient of the movable bearing;

a size of the movable bearing;

a shape of the movable bearing;

a size of the bearing channel;

a shape of the bearing channel; and an angle of the bearing channel surface with respect to the shaft.

18. The gravity lockout hinge of claim 11, wherein the gravity lockout hinge further comprises:

a movable spring disposed in a groove between the movable bearing and the bearing channel surface, the gravity lockout hinge is further configured to, when the gravity lockout hinge is in the alternate orientation position, the movable bearing is in contact with the shaft and a spring surface of the movable spring, and the first rotational force exerted on the second hinge element is greater than the sum of the first frictional torque and the second frictional torque exerted on the shaft:

cause the movable bearing to exert a lateral force on the movable spring to move the movable spring towards the bearing channel surface; and allow the angular position of the second hinge element to be increased.

19. The gravity lockout hinge of claim 11, wherein the gravity lockout hinge further comprises:

a bearing stop disposed in the bearing channel proximate a top edge of the bearing channel surface, the bearing stop configured to prevent the movable bearing from moving beyond the bearing stop.

20. The gravity lockout hinge of claim 11, wherein the movable spring comprises one of a leaf spring, a compression spring, and an extension spring.

* * * * *